United States Patent
Wang et al.

(10) Patent No.: US 9,291,093 B2
(45) Date of Patent: Mar. 22, 2016

(54) TURBOCHARGER FLOW CONTROL

(71) Applicant: GM GLOBAL TECHNOLOGY OPERATIONS LLC, Detroit, MI (US)

(72) Inventors: Yue-Yun Wang, Troy, MI (US); Ibrahim Haskara, Macomb, MI (US); Kevin Andrew Gady, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 139 days.

(21) Appl. No.: 13/762,549

(22) Filed: Feb. 8, 2013

(65) Prior Publication Data
US 2014/0227109 A1 Aug. 14, 2014

(51) Int. Cl.
F02B 37/12 (2006.01)
F02B 37/18 (2006.01)
F02B 37/24 (2006.01)
F02D 41/00 (2006.01)
F02D 41/14 (2006.01)
F02M 25/07 (2006.01)

(52) U.S. Cl.
CPC ............ F02B 37/12 (2013.01); F02B 37/18 (2013.01); F02B 37/24 (2013.01); F02D 41/0007 (2013.01); F02B 2037/122 (2013.01); F02D 41/0072 (2013.01); F02D 2041/1433 (2013.01); F02D 2200/0402 (2013.01); F02M 25/0707 (2013.01); F02M 25/0713 (2013.01); Y02T 10/144 (2013.01)

(58) Field of Classification Search
CPC . F02D 41/18; F02D 41/0007; F02D 41/0002; F02D 41/0072; F02D 2200/0402; F02D 2200/0406; F02B 37/18; F02B 37/24; F02M 25/0707; F02M 25/0754
USPC ................. 60/602, 605.2; 701/102–104, 108
See application file for complete search history.

(56) References Cited

U.S. PATENT DOCUMENTS

| 2003/0145591 | A1* | 8/2003 | Arnold ............................ 60/602 |
| 2003/0149522 | A1* | 8/2003 | Arnold ......................... 701/100 |
| 2008/0098734 | A1* | 5/2008 | Olsson ........................ 60/605.1 |
| 2008/0282698 | A1* | 11/2008 | Ferrari et al. ................... 60/602 |
| 2009/0090106 | A1* | 4/2009 | Muller ............................ 60/602 |
| 2009/0090107 | A1* | 4/2009 | Youssef et al. .................. 60/602 |
| 2009/0094009 | A1* | 4/2009 | Muller .............................. 703/7 |
| 2012/0222417 | A1* | 9/2012 | Fontvieille .............. F02D 23/00 60/602 |

* cited by examiner

Primary Examiner — Jorge Pereiro
Assistant Examiner — Jason T Newton
(74) Attorney, Agent, or Firm — Quinn Law Group, PLLC

(57) ABSTRACT

A method for controlling a turbocharger is provided. The turbocharger has a turbine operatively connected to an exhaust of an internal combustion engine, and a compressor operatively connected to an intake of the engine. The method includes determining a boost pressure command for the compressor. The boost pressure command is configured to provide sufficient combustion reactant for the engine. The method includes calculating a compressor power from the determined boost pressure command, and calculating a turbine flow from the calculated compressor power. The method commands the turbocharger to operate at the calculated turbine flow.

1 Claim, 3 Drawing Sheets

TURBOCHARGER FLOW CONTROL

TECHNICAL FIELD

This disclosure relates to control of turbochargers for powertrains.

BACKGROUND

Internal combustion engines sometimes utilize turbochargers to provide forced induction. One or more turbochargers are driven by exhaust gas from the engine. The energy captured from the exhaust gas is used to pressurize intake gases used in combustion within the engine.

SUMMARY

A method for controlling a turbocharger is provided. The turbocharger has a turbine operatively connected to an exhaust of an internal combustion engine, and a compressor operatively connected to an intake of the engine. The method includes determining a boost pressure command for the compressor. The boost pressure command is configured to provide sufficient combustion reactant for the engine.

The method includes calculating a compressor power from the determined boost pressure command, and calculating a turbine flow from the calculated compressor power. The method also includes commanding the turbocharger to operate at the calculated turbine flow, thereby providing the desired boost pressure to the engine.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
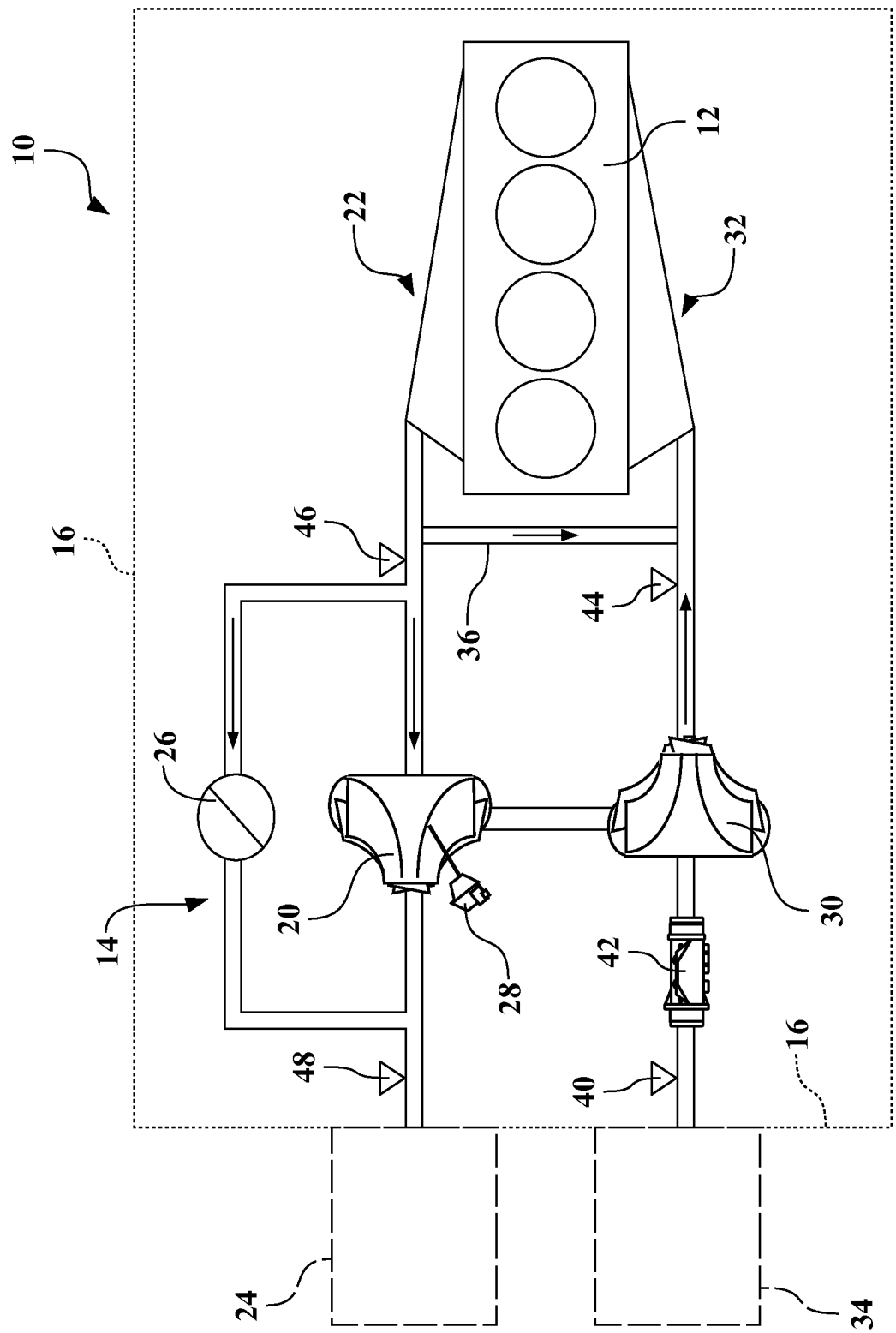
FIG. 1 is a schematic diagram of a portion of a powertrain having a variable turbocharger.

Referring to the drawings, like reference numbers correspond to like or similar components wherever possible throughout the several figures. There is shown in FIG. 1 a portion of a powertrain 10, which may be a conventional or hybrid powertrain. The schematic powertrain 10 includes an internal combustion engine 12 and a turbocharger 14. The engine 12 may be spark ignition or compression ignition.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

As shown in FIG. 1, a control system 16 is in communication with, and capable of operating, the powertrain 10. The control system 16 is illustrated in highly schematic fashion. The control system 16 is mounted on-board the vehicle and in communication with several components of the powertrain 10. The control system 16 performs real-time, on-board detection, diagnostic, and calculation functions for the powertrain 10.

The control system 16 may include one or more components with a storage medium and a suitable amount of programmable memory, which are capable of storing and executing one or more algorithms or methods to effect control of the powertrain 10. Each component of the control system 16 may include distributed controller architecture, and may be part of an electronic control unit (ECU). Additional modules or processors may be present within the control system 16. If the powertrain 10 is a hybrid powertrain, the control system 16 may alternatively be referred to as a Hybrid Control Processor (HCP).

The turbocharger 14 includes a turbine 20 operatively connected to an exhaust side of the engine 12, which may simply be referred to as exhaust 22. The turbine 20 is disposed between the exhaust 22 and a turbine output 24, which may then pass through additional components (for example, mufflers, catalytic converters, and the like) before expelling exhaust products to the atmosphere.

The turbocharger 14 is shown equipped with both a wastegate 26 and a variable geometry turbine, which may be referred to simply as VGT 28. However, many configurations will have only one or the other. The wastegate 26 is configured to selectively allow gas exiting the exhaust 22 to bypass the turbine 20, which thereby alters flow through the turbine 20. The VGT 28 selectively alters an effective aspect ratio of the turbine 20 by varying a VGT position, which thereby alters the response of the turbine 20 to flow from the exhaust 22.

The turbocharger 14 also includes a compressor 30 operatively connected to an intake side of the engine 12, which may simply be referred to as intake 32. The compressor 30 is disposed between the intake 32 and an atmosphere 34. As used herein, atmosphere 34 refers generally to the air entering the turbocharger 14 on the side of the compressor 30. Note that prior to the atmosphere 34, air may have already passed through other components, such as air filters.

Additional components may be disposed between the compressor 30 and the engine 12. For example, and without limitation, an intercooler may reduce the temperature of air leaving the compressor 30 before entering the engine 12. In some configurations, exhaust gas recirculation, referred to herein as EGR 36 and shown in phantom, may selectively move some exhaust gases from the exhaust 22 to the intake 32 to be combined with air delivered by the compressor 30. For some of the methods described herein, calculations regarding the turbocharger 14 may be modeled as if the EGR 36 is a portion of the engine 12 and is unrelated to activity of the turbocharger 14.

The turbine 20 is configured to transfer power to the compressor 30. In many configurations, the compressor 30 will be mechanically connected to the turbine 20 for substantiallycommon rotation therewith. However, other configurations may exist in which the turbine 20 and compressor 30 are linked by gearing arrangements or are electrically linked via generator-motor combinations.

The turbine 20 converts some of the energy of the exhaust gases leaving the exhaust 22 into mechanical energy that is transferred to the compressor 30. In turn, the compressor 30 uses the mechanical energy to pressurize air from the atmosphere 34 and provide that pressurized air to the intake 32.

Throughout the description, symbols may be used to assist in describing different characteristics or states of the powertrain, whether known, unknown, or determined, and whether fixed or variable. Whenever possible, standard or highly recognizable symbols and nomenclature combinations have been used. This description attempts to maintain consistent nomenclature for all symbols. However, those having ordinary skill in the art will recognize that equivalent symbols or nomenclature may be used interchangeably.

The letter "a" may denote characteristics of the atmosphere 34, such that pressure and temperature at the atmosphere 34 may be denoted $P_a$ and $T_a$, respectively. Similarly, the letters "to" may denote characteristics of the turbine output 24, such that pressure and temperature at the turbine output 24 may be denoted $P_{to}$ and $T_{to}$, respectively.

The letter "i" may denote characteristics of the intake 32 and the letters "ex" may denote characteristics of the exhaust 22, such that pressure at the intake 32 and the exhaust 22 may be denoted $P_i$ and $P_{ex}$, respectively. The letter "t" may denote characteristics of the turbine 20 and the letter "c" may denote characteristics of the compressor 30, such that power at the turbine 20 and the compressor 30 may be denoted $E_t$ and $E_c$, respectively. When included in the turbocharger 14, the wastegate 26 may be denoted with the letters "wg."

The powertrain 10 includes sensors or sensor points, which are shown schematically in FIG. 1 as triangles. These sensors or sensor points may generally represent a component or a point of determination for one or more characteristics of the powertrain 10. More than one state, characteristic, or variable value may be determined by any single sensor or sensor point illustrated in FIG. 1.

An atmospheric sensor point 40 and a mass-flow sensor 42 measure or otherwise determine the characteristics of air entering the compressor 30 of the turbocharger 14. An intake sensor point 44 represents characteristics between the compressor 30 and the intake 32.

The pressure at the intake, $P_i$, may also be referred to as the boost pressure, and is the output of energy transferred from the turbine 20 to the compressor 30. In many configurations, the intake sensor point 44 will include an actual sensor, which determines the actual boost pressure. However, the intake sensor point 44 also represents the location of a desired boost pressure or boost pressure command, which is the pressure configured to provide sufficient combustion reactant for the engine 12.

Based upon operating needs of the powertrain 10, or the engine 12, a specific amount of fuel and a specific amount of air will be requested for combustion within the engine 12. These are the primary reactants contributing to internal combustion, which produces power for the powertrain 10. In some systems, the desired boost pressure may be considered as an input or given, but in others the desired boost pressure will be calculated or determined.

The desired boost pressure may be determined from the accelerator pedal position or other power and torque requests for the engine 12, as determined by the control system 16. For the best operation, the desired boost pressure is equal to the actual boost pressure. One exemplary formula for determining the desired boost pressure is described below.

An exhaust sensor point 46 measures or otherwise determines the characteristics of combustion reactants exiting the engine 12 through the exhaust 22. The exhaust sensor point 46 may measure the temperature, $T_{ex}$, of the gases entering the turbocharger 14. In many configurations, the pressure and mass flow, $P_{ex}$ and $m_{ex}$, of the exhaust 22 will not be known, such that the exhaust sensor point 46 illustrates the location at which those characteristics will be determined. A turbine output sensor point 48 measures or otherwise determines the characteristics of combustion reactants exiting the turbocharger 14.

In order to provide the desired boost pressure, the control system 16 varies the power of the turbine 20. Varying the flow of exhaust gases through the turbine 20, varies power output of the turbine 20, which harvests energy from the exhaust gases and transfers that energy to the compressor 30. However, the gases exiting the exhaust 22 may vary greatly depending upon operating conditions of the engine 12, which in turn varies the power captured by the turbine 20 and transferred to the compressor 30 and increases difficulty in accurately providing the desired boost pressure.

One solution for providing the desired boost pressure for the powertrain 10 is to create large, multi-dimensional look-up tables. These look-up tables include, at least, atmospheric conditions, air flow into the turbocharger 14, operating states of the engine 12, and conditions at the exhaust 22. Such look-up tables can be very large and may be accurate only within a small range of atmospheric conditions. Therefore, different look-up tables may be required if the vehicle is moved between high-altitude and seal-level operation or between extreme temperature zones. In some instances, these look-up tables must be derived from calibration and testing on each actual vehicle into which the powertrain 10 is installed, in order to account for manufacturing variability.

Another solution for providing the desired boost pressure is for the powertrain 10 to use closed-loop feedback. In such a system, the actual boost pressure is monitored and compared to the desired boost pressure. If there is a difference between the actual boost pressure and the desired boost pressure, an adjustment is made to the power of the turbine 20. For example, if the actual boost pressure is too low, the power output of the turbine 20 is increased. However, a closed-loop system is likely to have considerable time lag, such that the actual boost pressure follows (in terms of time) the desired boost pressure.

For the powertrain 10, the control system 16 implements a method or algorithm for controlling power of the turbine 20. The method is a feed-forward method, which instructs the turbocharger 14 to operate at settings—through alteration of either the wastegate 26 or the VGT position—that will result in the actual boost pressure being substantially equal to the desired boost pressure. The control system 16 may then also use a closed-loop modification system to make minor corrections to the output of the feed-forward method, if needed.

Figure 2:
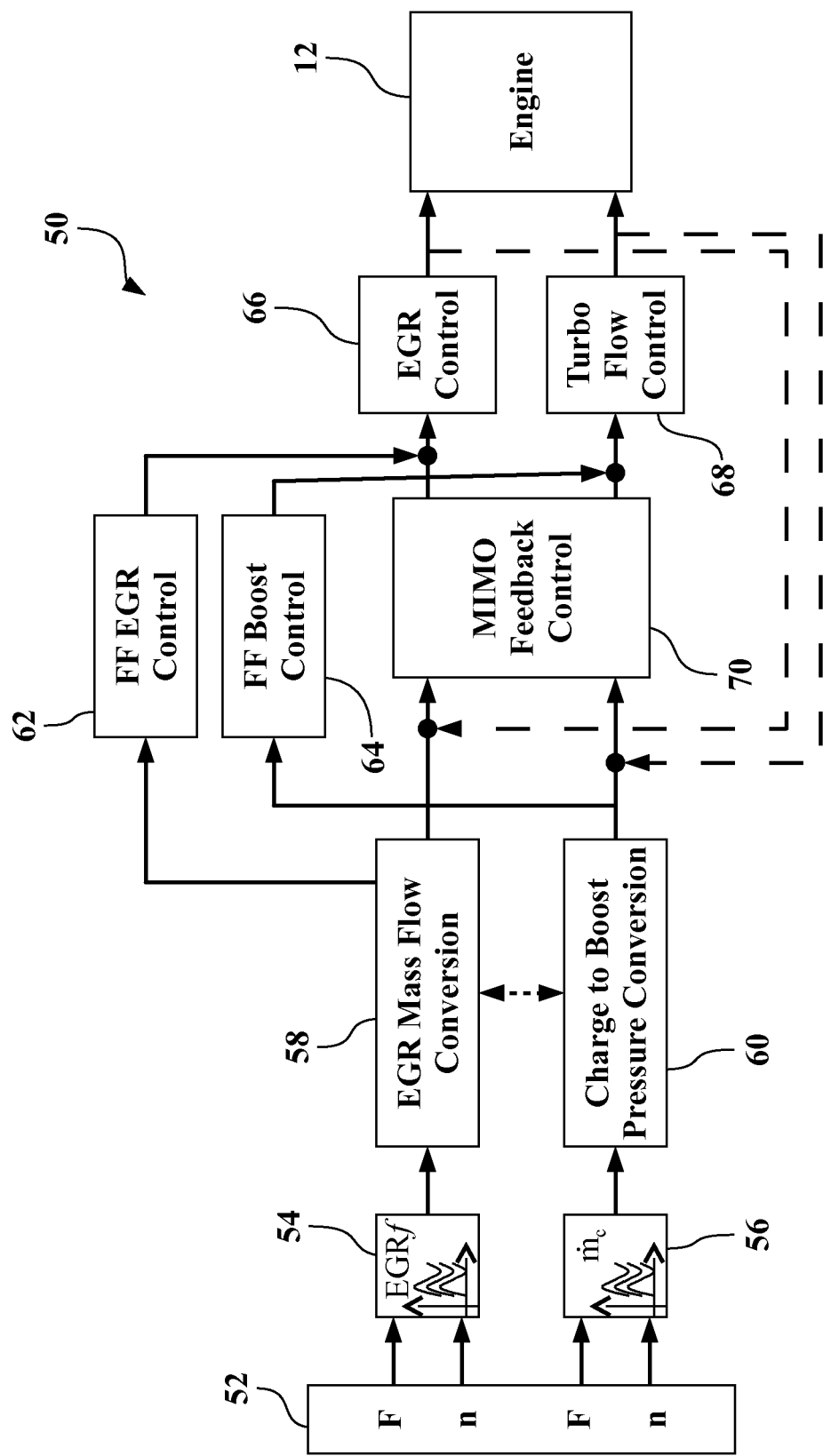
FIG. 2 is a schematic diagram of a controller architecture, which may be used with the powertrain shown in FIG. 1.

Referring now to FIG. 2, and with continued reference to FIG. 1, there is shown a schematic diagram of a controller architecture 50, which may be embodied within the control system 16. The architecture 50 illustrates how the control system 16 may monitor several inputs and may calculate several commands for operating the engine 12.

A set of monitored inputs 52 are fed into a look-up table 54 and a look-up table 56. The monitored inputs 52 include, at least, fuel mass being used by the engine 12 and rotational speed of the engine 12. The look-up table 54 determines an EGR fraction, EGRf, from the monitored inputs 52. The EGR fraction is the amount of recirculated exhaust gases as a fraction of the amount of intake air fed into the intake 32. The look-up table 56 determines a charge flow command, $m_c$, from the monitored inputs 52.

The control system 16 uses the EGR fraction to determine an EGR flow command, $m_{EGR}$, at an EGR mass flow conversion 58. The EGR flow command may be determined with the formula $m_{EGR}=m_c*EGRf$.

The control system 16 uses the charge flow command to determine a desired boost pressure at a charge to boost conversion 60. Processes for determining the desired boost pressure are discussed in more detail herein.

The EGR flow command is used by an EGR feed-forward control 62 and the desired boost pressure is used by a boost feed-forward control 64. The EGR feed-forward control 62 is incorporated into an EGR valve control 66, which determines the position of an EGR valve (not shown) to vary the flow of exhaust gases between the exhaust 22 and the intake 32 of the engine 12.

The boost feed-forward control 64 is incorporated into a turbo flow control 68, which determines operation of the turbocharger 14 to vary the power transferred from the turbine 20 to the compressor 30. The turbo flow control 68 may be linked to and controlling the wastegate 26, the VGT 28, or both.

The architecture 50 is also shown with a feedback controller 70, which may be a MIMO controller, used for closed-loop modification. Based upon actual, measured states at the EGR 36 and the intake sensor point 44, the feedback controller 70 sends modification signals to the EGR valve control 66 and the turbo flow control 68, respectively. Therefore, if there are slight errors in the open-loop commands from the EGR feed-forward control 62 and the boost feed-forward control 64, the feedback controller 70 may implement minor corrections to better achieve the desired EGR flow command and the desired boost pressure.

Figure 3:
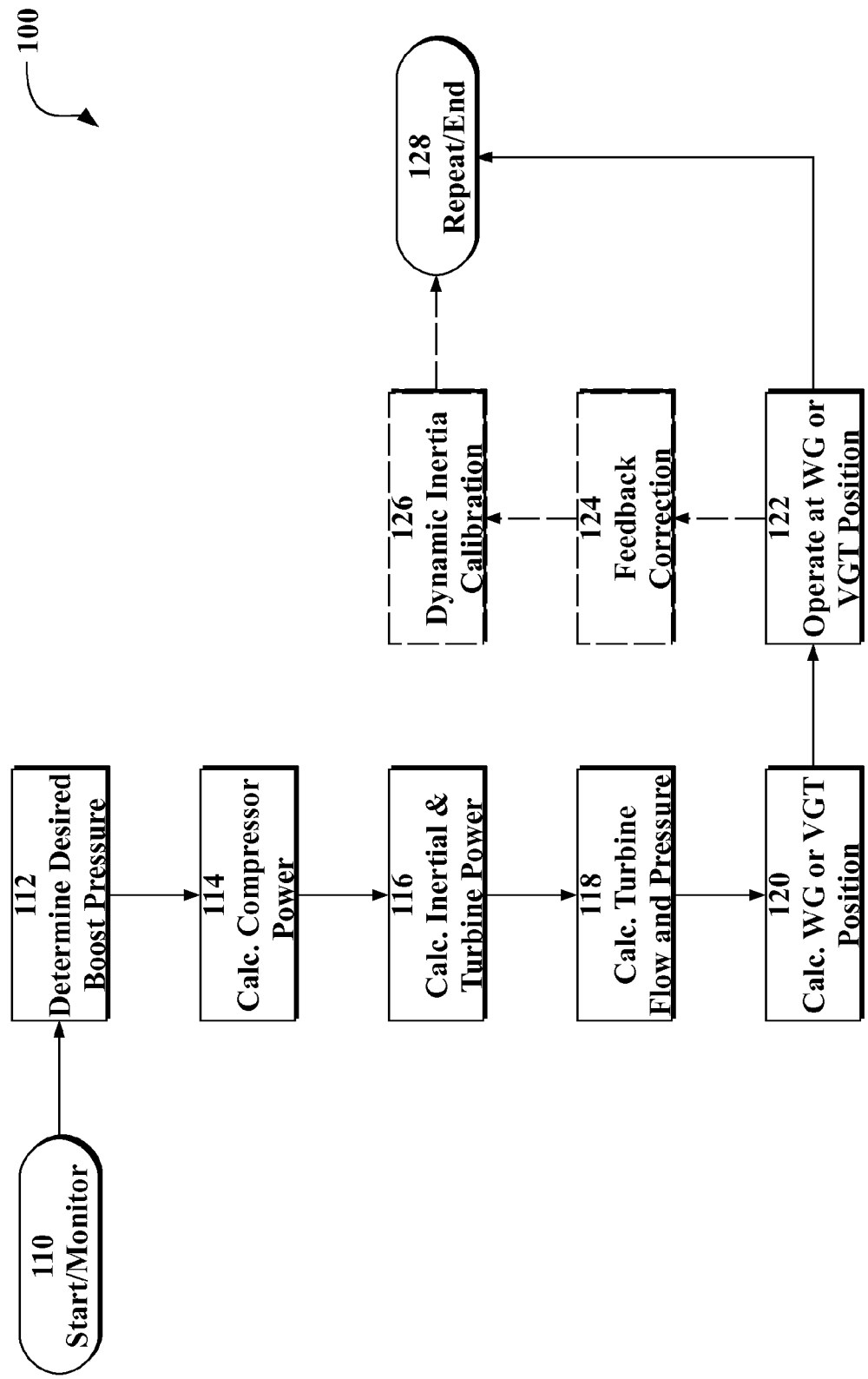
FIG. 3 is a schematic flow chart illustrating an algorithm or method for controlling a turbocharger, such as within the powertrain of FIG. 1.

Referring now to FIG. 3, and with continued reference to FIGS. 1-2, there is shown a method 100 for controlling a powertrain, such as the powertrain 10 shown in FIG. 1. The method 100 may be executed completely or partially within the control system 16.

FIG. 3 shows only a high-level diagram of the method 100. The exact order of the steps of the algorithm or method 100 shown may not be required. Steps may be reordered, steps may be omitted, and additional steps may be included. Furthermore, the method 100 may be a portion or sub-routine of another algorithm or method.

For illustrative purposes, the method 100 is described with reference to elements and components shown and described in relation to FIG. 1 and may be executed by the powertrain 10 itself or by the control system 16. However, other components may be used to practice the method 100 and the invention defined in the appended claims. Any of the steps may be executed by multiple controls or components of the control system 16.

Step 110: Start/Begin Monitoring.

The method 100 may begin at a start or initialization step, during which time the method 100 is made active and is monitoring operating conditions of the vehicle, the powertrain 10 and, particularly, the engine 12 and the turbocharger 14. Initiation may occur, for example, in response to the vehicle operator inserting the ignition key or in response to specific conditions being met. The method 100 may be running constantly or looping constantly whenever the vehicle is in use.

Any of the data output from the sensor points may be monitored by the method 100. Furthermore, simple calculations within control system 16 or data provided by other modules or controllers are not described in detail and may be considered as monitored by the method 100.

Step 112: Determine Desired Boost Pressure.

The method 100 includes determining a boost pressure command or a desired boost pressure, $P_i$, for the compressor 30. The desired boost pressure may be provided by another controller and is configured to provide sufficient combustion reactant for the engine 12. Considerations for the desired boost pressure include pedal position or other power and torque requests for the engine 12.

Alternatively, the desired boost pressure may be calculated by the control system 16 as part of the method 100. The desired boost pressure may be determined according to a boost command equation, shown as equation 1.

$$P_i = \frac{2R \cdot T_i \cdot \dot{m}_c}{n \cdot D \cdot \eta(EGRf, n)} \quad (1)$$

In the boost command equation, R is the ideal gas constant; $T_i$ is the intake temperature; $m_c$ is the charge flow command; n is the rotational speed (often in RPM) of the engine 12; D is the engine displacement; and $\eta$ is the engine volumetric efficiency equation, which is a function of EGR fraction, EGRf and speed. In configurations without the EGR 36, the charge flow command is equal to the atmospheric mass flow, $m_a$, but with the EGR 36, the charge flow command is equal to the sum of the atmospheric mass flow and the EGR mass flow, $m_{EGR}$.

Step 114: Calculate Compressor Power.

From the desired boost pressure, the method 100 may calculate a compressor power for the compressor 30. Generally, the compressor power is the amount of power needed to increase the atmospheric pressure, $P_a$, to the desired boost pressure, $P_i$.

The desired compressor power may be determined from either a polynomial equation or lookup table. The compressor power is related to the enthalpy of the compressor 30 multiplied by a compressor power function. The desired compressor power may be determined from Equation 2.

$$E_c = v \cdot h_c \cdot r_c(P_{rc}, Q_c) \quad (2)$$

In determining the desired compressor power from equation 2: $h_c$ is the compressor enthalpy and v is a correction factor based upon the enthalpy of the turbine 20, which delivers power to the compressor 30; and $r_c$ is the compressor power function, determined from the compressor pressure ratio, $P_{rc}$, and the corrected compressor flow, $Q_c$.

The compressor pressure ratio, $P_{rc}$, is equal to $P_i/P_a$, and represents the pressure gain provided by the compressor 30. The atmospheric pressure, $P_a$, is known from the atmospheric sensor point 40 and the desired boost pressure, $P_i$, is either provided as a given to the method 100 or is determined from the boost command equation herein.

The corrected compressor flow, $Q_c$, and the corrected turbine flow, $Q_t$, may be used by the method 100 as an alternative to the actual compressor flow, $m_a$, and the actual turbine flow, $m_t$. The corrected compressor flow is calculated from an Equation 3.

$$Q_c = \dot{m}_a \cdot v(P_a, T_a) \quad (3)$$

In equation 3, v is the correction factor function. By using the corrected flow instead of actual flow, the method 100 accounts for variation in altitude and temperature, which prevents the method 100 from needing substantial recalibration if the vehicle changes elevation or temperature zones.

The correction factor function ν may be any number of functions based upon pressure, temperature, or other inputs that will allow the corrected compressor flow to account for variations in altitude or temperature. For example, and without limitation, the correction factor function ν may have an inverse relationship to air density, such that the corrected compressor flow becomes an Equation 4.

$$Q_c = \dot{m}_a \cdot \nu(P_a, T_a) = \dot{m}_a \cdot (T_a, P_a) \quad (4)$$

The desired compressor power may also be expanded into a polynomial function, as shown in Equation 5.

$$E_c = \nu(P_{to}, T_{ex}) \cdot h_c \cdot (a_1 + a_2 Q_c + a_3 Q_c^2 + a_4 P_{rc} + a_5 P_{rc}^2 + a_6 Q_c P_{rc}) \quad (5)$$

which is substantially equivalent to the basic desired compressor power function above. In the polynomial compressor power function: $T_{ex}$ is the temperature of exhaust 22 and $P_{to}$ is the pressure at the turbine output, both of which are used to determine a correction factor function ν as a result of conditions at the turbine 20; and $a_1$ through $a_6$ are constants. The constants $a_1$ through $a_6$ are based upon the specific characteristics of the turbocharger 14 and may be determined by, for example, dynamometer testing or modeling with computational fluid dynamics.

The enthalpy of the turbine 20 and the compressor 30 may be determined by the method 100 based upon the flow rate and temperature of the gases passing through the turbine 20 and the compressor 30. The enthalpy of the turbine 20, $h_t$, and the compressor 30, $h_c$, may be expressed in Equation 6 and Equation 7.

$$h_t = \dot{m}_t c_p T_{ex} \quad (6)$$

$$h_c = \dot{m}_a c_p T_a \quad (7)$$

In Equations 6 and 7, $c_p$ is specific heat and $T_a$ and $T_{ex}$ are the atmospheric and exhaust temperatures, respectively. If the turbocharger 14 is equipped with the VGT 28 and does not include the wastegate 26, the turbine flow and the exhaust flow are equal, such that $m_t = m_{ex}$.

Note that, as shown herein, the turbine enthalpy may not be directly calculated. Instead, the method 100 determines the turbine pressure ratio and corrected turbine flow from compressor power and inertial power, without determining the turbine enthalpy.

Note that the above compressor power function or polynomial compressor power function may be converted into one or more look-up tables, although the respective look-up tables may be large. Generally, as used herein, any function may be placed into a look-up table, instead of calculated directly from the equation by the control system 16. Depending upon the number of inputs to the equation, look-up tables may either increase or decrease computational throughput for the method 100.

Step 116: Calculate Inertial Power and Turbine Power.

The method 100 may calculate the turbine power or desired turbine power, $E_t$. This calculation may occur directly through Equation 8.

$$E_t = h_t \cdot r_t (P_{rt}, VGT) = h_t \cdot r_t (Q_t, VGT) \quad (8)$$

The desired turbine power is the power needed from the turbine 20 in order to supply the calculated compressor power to the compressor 30. Therefore, the method 100 may also use the compressor power to indirectly calculate the desired turbine power. In most operating conditions, the turbocharger 14 is already spinning, and will have some energy and power as a result of its inertia. Therefore, the desired power, $E_t$, from the turbine 20 is shown in Equation 9.

$$\eta_m E_t = E_c + E_j \quad (9)$$

In the above, $E_j$ is the inertial power of the spinning turbocharger 14; and $\eta_m$ is the mechanical efficiency between the turbine 20 and the compressor 30, which may be close enough to one—particularly where the turbine 20 and compressor 30 are mechanically linked in close proximity—such that $\eta_m$ can be ignored in the turbine power equation.

Therefore, the method 100 calculates the desired power for the turbine 20 based upon power balance with the compressor power and the inertial power. The inertial power is shown in Equation 10.

$$E_j = J \cdot \omega \cdot \dot{\omega} \quad (10)$$

In Equation 10, the method 100 determines the inertial power from the rotation, ω, and acceleration, dω/dt, of the turbocharger 14 and the area moment of inertia, J, of the turbocharger 14.

As shown in the inertial power function, the method 100 may also calculate the rotational speed of the turbocharger 14. The rotational speed is calculated by an Equation 10.

$$\omega = d_1 + d_2 Q_c + d_3 Q_c^2 + d_4 P_{rc} + d_5 P_{rc}^2 + d_6 Q_c P_{rc} \quad (11)$$

where $d_1$ through $d_6$ are constants. The constants are based upon specific characteristics of the turbocharger 14 used in the powertrain 10 and may be determined by, for example, dynamometer testing or modeling with computational fluid dynamics. From the rotational speed, the method 100 may also calculate the rotational acceleration, dω/dt, of the turbocharger 14. Acceleration may be determined, for example and without limitation, by taking the derivative of the rotational speed equation.

Alternatively, acceleration may be determined through iterative sampling and analysis of changes to the rotational speed. Consecutive iterations of the method 100 may be labeled as occurring at $time_k$, the instantaneous or present iteration, and $time_{k-1}$, the previous iteration. Therefore, the method 100 may compare the rotational speed, ω, from $time_k$ and $time_{k-1}$, and determine the change between the two iterations. If there is no change in the rotational speed, the acceleration is zero.

With the inertial power and the compressor power, the method 100 may essentially skip calculating the turbine power, and the method 100 may instead utilize computational resources calculating the turbine flow, $Q_t$, and the turbine pressure ratio, $P_{rt}$.

Step 118: Calculate Turbine Flow and Pressure.

The method 100 may calculate the corrected turbine flow as a function of the compressor power and the inertial power. Then, the method 100 may calculate turbine pressure ratio as a function of the corrected turbine flow. The corrected turbine flow and the turbine pressure ratio may be calculated by Equation 12 and Equation 13.

$$Q_t = f(E_c + E_j) = b_1 + b_2 E_c + b_3 E_c^2 + b_4 E_j \quad (12)$$

$$P_{rt} = f(Q_t) = c_1 + c_2 E_c + c_3 E_c^2 \pm c_4 E_j \quad (13)$$

where $b_1$ through $b_4$ and $c_1$ through $c_4$ are constants. The constants are based upon specific characteristics of the turbocharger 14 used in the powertrain 10 and may be determined by, for example, dynamometer testing or modeling with computational fluid dynamics. As an alternative to the polynomial forms of the equations or functions for $Q_t$ and $P_{rt}$, the method 100 may use look-up tables to find the $Q_t$ and $P_{rt}$ from $E_c$ and $E_j$.

These are the calculated flow characteristics needed for the turbine 20—as one side of the turbocharger 14—to deliver sufficient power to the compressor 30—as the other side of the turbocharger 14—in order to provide the sufficient power to achieve the desired boost pressure, $P_t$. From these flow characteristics, the method 100 may then determine how the turbocharger 14 should modify flow of exhaust gases through the turbine 20.

Step 120: Calculate Wastegate Position or VGT Position.

Modifying the flow of exhaust gases from the exhaust 22 to the turbine output 24 alters the effective flow through the turbine 20. Furthermore, modifying flow through the turbine 20 changes the amount of power drawn from the exhaust 22 and transferred to the intake 32 as the desired boost pressure. Generally the modification occurs through either the wastegate position of the wastegate 26 or the VGT position of the VGT 28.

Changing the VGT position alters flow patterns through the turbine 20, itself. For example, variable blades or fins within the turbine 20 selectively change the pressure delivered to the blades of the turbine 20, such that less of the available energy from the gases is transferred to the turbine 20. The wastegate 26 achieves a similar result by allowing exhaust gases to avoid passing through the turbine 20 at all. As the wastegate position increases, less of the available exhaust product is routed through the turbine 20 before reaching the turbine output 24, such that less of the available energy from the gases is transferred to the turbine 20.

For the wastegate 26 configuration, the mass flow from the exhaust 22 is divided between the turbine 20 and the wastegate 26. Therefore, the method 100 may determine the exhaust flow and the wastegate flow by using Equation 14 and Equation 15, respectively.

$$\dot{m}_{ex} = \dot{m}_c + \dot{m}_{fuel} - \dot{m}_{egr} \qquad (14)$$

$$\dot{m}_{wg} = \dot{m}_{ex} - \dot{m}_t \qquad (15)$$

where $m_{fuel}$ is the mass of fuel added to the charge flow in the engine 12 for combustion; and $m_{EGR}$ is the flow of exhaust products redirected from the exhaust 22 back into the intake 32 through the EGR 36. Note that the method 100 may either ignore the effects of the EGR 36 or may assume that the EGR 36 is completely contained within the engine 12.

The wastegate position is controlled to alter the area of the wastegate 26. By increasing the wastegate area, $A_{wg}$, more gases from the exhaust 22 flow through the wastegate 26 instead of the turbine 20. The method 100 may determine the desired wastegate area from one of the following three calculations. The first calculation uses Equation 16, in which area is a function of wastegate flow (the difference between exhaust flow and turbine flow) and pressure ratio across the turbine 20.

$$A_{wg} = f(Q_{ex} - Q_t, P_{rt}) \qquad (16)$$

Mass flow calculations based upon the orifice function, $\Psi$, which is a standard orifice function derived from the Bernoulli equation. The mass flow calculations for flow through the turbine 20, $m_t$, and total exhaust flow, $m_{ex}$, are given by Equations 17 and 18, respectively.

$$\dot{m}_t = A_t \frac{P_x}{\sqrt{RT_x}} \Psi(P_{rt}) \qquad (17)$$

$$\dot{m}_{ex} = (A_t + A_{WG}) \frac{P_x}{\sqrt{RT_x}} \Psi(P_{rt}) \qquad (18)$$

In the mass flow calculations, the method 100 determines $m_t$ by viewing the turbine 20 as an orifice, and $m_{ex}$ by viewing the turbine and the wastegate as a combined orifice; $\Psi$ is the standard orifice function. From the mass flow calculations in Equation 17 and Equation 18, a second calculation for wastegate area is given as Equation 19.

$$A_{wg} = f\left(\frac{Q_t}{Q_{ex}}, P_{rt}\right) \qquad (19)$$

In Equation 19, wastegate area is a function of flow ratio through the turbine 20 and the pressure ratio across the turbine 20. However, in many embodiments, the method 100 may ignore the effects of the turbine pressure ratio, $P_{rt}$, and simply determine wastegate area, $A_{wg}$, as a function of the flow ratio, $Q_t/Q_{ex}$.

A third calculation of the area of the wastegate 26 is given in Equation 20.

$$A_{wg} = f\left(\frac{E_c + E_j}{P_{to}\sqrt{T_{ex}}}, \frac{\dot{m}_{ex}\sqrt{T_{ex}}}{P_{to}}\right) \qquad (20)$$

where each of the inputs to the second function is known or calculated in other portions of the method 100. The exact functions described herein, where not given explicitly, may be determined through, for example: a look-up table, a neural network model, or a polynomial. Equation 20 has a polynomial equivalent, similar to the illustrative polynomials of Equations 11, 12, and 13, which may be derived based upon testing or modeling of the exact turbocharger 14.

Once the wastegate area $A_{wg}$ is determined, a position command for the wastegate 26 may be determined, depending upon the exact shape, configuration, and actuation mechanism for opening and closing the wastegate 26. Any given wastegate 26 may be commanded by the control system 16 to open to a defined area based upon an electric, mechanical, or electro-mechanical signal command.

Similarly, the method 100 may determine the VGT position as a function of the corrected turbine flow, $Q_t$, and the desired turbine power, $E_t$. Note that the mass flow through the turbine 20, $m_t$, is equal to total exhaust flow, $m_{ex}$, in the VGT function because there is no alternative route (such as through a wastegate 26), such that $m_t = m_a + m_{fuel}$. Therefore, the VGT position is determined from the same equation as the wastegate area, but the function is simplified because it needs to account for $m_{ex}$ only instead of $m_t$ and $m_{ex}$. The VGT position may be determined with Equation 21.

$$VGT position = f\left(\frac{E_c + E_j}{P_{to}\sqrt{T_{ex}}}, \frac{\dot{m}_{ex}\sqrt{T_{ex}}}{P_{to}}\right) \qquad (21)$$

Note that exhaust flow, $m_{ex}$, may be calculated with a time delay, σ, for the airflow mass, $m_a$. The time delay accounts for the time needed to move gases from atmospheric sensor point 40 to exhaust sensor point 46. Therefore, exhaust flow may be calculated at time t from airflow mass at time t−τ.

Varying the VGT position changes the energy captured by the turbine 20 and therefore changes pressure drop across the turbine 20. The method 100 may determine the function for the VGT position through testing or computational fluid dynamics and implement the function through, for example: a look-up table, a neural network model, or a polynomial.

Step 122: Operate at Wastegate Position or VGT Position.

After determining either the wastegate position or the VGT position, the method 100 commands operation of the turbocharger at the determined position. An actuator may be signaled to alter the wastegate area, $A_{wg}$, based upon the calculated wastegate position. Similarly, the VGT 28 may include an actuator to change the position of blades within the turbine 20 based upon the calculated VGT position.

Either the wastegate position or the VGT position are used to control the turbocharger 14 based upon feed-forward control scheme. With these controls, the method 100 moves from desired boost pressure to flow control for the turbine 20 to achieve that desired boost pressure substantially immediately, as an open-loop control for the turbine 20.

Step 124: Optional, Minor Feedback Correction.

The method 100 may include dynamic feedback correction, as shown diagrammatically in FIG. 2. Because the feed-forward flow conditions determined by the method 100 are modeled estimates, it is possible that the measured or actual boost pressure, $P_{i\_measured}$, may vary slightly from the desired boost pressure.

Therefore, the method 100 optionally includes a feedback correction step, which uses close-loop techniques to adjust the wastegate position or the VGT position based upon the actual boost pressure at the intake sensor point 44. If the method 100 determines that the actual boost pressure is below the desired boost pressure, the method 100 increases flow to the turbine 20, which may include decreasing the area of the wastegate 26 to increase flow to the turbine 20. Similarly, if the method 100 determines that the actual boost pressure is above the desired boost pressure, the method 100 decreases flow to the turbine 20, which reduces the power transferred to the compressor 30. These feedback signals may be considered as either adjustments or combinations to the feed-forward commands.

Step 126: Optional, Dynamic Calibration of Inertia.

The method 100 may include calibration of the inertia, J, of the turbocharger 14, which is factored into the inertial power equation and the rotation speed equations. The dynamic calibration may be implemented by an Equation 22, in which the inertia of the turbocharger 14 on subsequent loops is adjusted based upon differences between the desired boost pressure, $P_i$, and the actual boost pressure, $P_{i\_measured}$.

$$J_{k+1} = J_k + \beta \cdot \dot{\omega} (P_i - P_{i\_measured}) \quad (22)$$

In Equation 22, $J_{k+1}$ is the inertia of the turbocharger 14 on subsequent loops or iterations of the method 100, $J_k$ is the inertia used on the current loop, and Beta is a correction factor. Therefore, the method 100 is able to correct for errors used in calculating the inertia of the turbocharger 14 and quickly iterates to convergence of $J_k$ and $J_{k+1}$.

Step 128: End/Repeat.

After commanding operation of the turbocharger 14 and making or recording any corrections or adjustments for subsequent loops, the method 100 either ends or repeats. The method 100 may proceed to determine the desired boost pressure, $P_{i\_k+i}$, for the next iteration and operation of flow through the turbine 20.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A method for controlling a turbocharger having a turbine operatively connected to an exhaust of an internal combustion engine and having a compressor operatively connected to an intake of the engine, the method comprising:

determining, via an electronic control unit, engine operating conditions based on air intake flow at at least one of the intake of the engine or a compressor inlet and based on engine exhaust flow at at least one of a turbine inlet or a turbine outlet;

calculating a boost pressure command $P_i$ for the compressor from the equation:

<Equation 1: $P_i$> wherein R is the ideal gas constant, $T_i$ is a current temperature at the intake, $\dot{m}_c$ is a current charge flow command determined by the electronic control unit, n is a determined rotational speed of the engine, D is a displacement of the engine, and η is engine volumetric efficiency, which is calculated as a function of EGRf and the current rotational speed of the engine n, wherein EGRf is an exhaust gas recirculation fraction;

calculating a compressor flow $Q_c$ from the equation:

<Equation 2: $Q_c$> wherein $\dot{m}_a$ is a determined mass flow to the compressor, $T_a$ is atmospheric temperature, and $P_a$ is atmospheric pressure;

calculating a compressor pressure ratio $P_{rc}$ from the equation:

<Equation 3: $P_{rc}$> wherein, $P_i$ is the calculated boost pressure command and $P_a$ is atmospheric pressure;

calculating a compressor power $E_c$ from the equation:

<Equation 4: $E_c$> wherein $T_{ex}$ is exhaust temperature, $P_{to}$ is a pressure at an output of the turbine, $\dot{m}_a$ is the mass flow to the compressor, $C_p$ is specific heat of the engine exhaust, $T_a$ is atmospheric temperature, $a_1$ through $a_6$ are constants specific to the turbocharger, $P_{rc}$ is the calculated pressure ratio across the compressor, and $Q_c$ is the calculated compressor flow;

calculating a turbine flow from the equation:

<Equation 5: $Q_t$> wherein $E_j$ is a calculated inertial power and $E_c$ is the calculated compressor power; and commanding the turbocharger to operate at the calculated turbine flow $Q_t$.

* * * * *